(12) United States Patent
Guo et al.

(10) Patent No.: US 11,743,461 B2
(45) Date of Patent: Aug. 29, 2023

(54) VIDEO ENCODING APPARATUS, VIDEO DECODING APPARATUS, VIDEO PLAYBACK SYSTEM AND METHOD

(71) Applicant: BOE TECHNOLOGY GROUP CO., LTD., Beijing (CN)

(72) Inventors: Xiaoqin Guo, Beijing (CN); Baoyu Shi, Beijing (CN); Jingyu Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/481,432

(22) Filed: Sep. 22, 2021

(65) Prior Publication Data
US 2022/0094924 A1 Mar. 24, 2022

(30) Foreign Application Priority Data
Sep. 23, 2020 (CN) .......................... 202011008717.2

(51) Int. Cl.
| H04N 19/119 | (2014.01) |
| H04N 19/423 | (2014.01) |
| H04N 19/172 | (2014.01) |
| H04N 19/177 | (2014.01) |
| H04L 65/70 | (2022.01) |
| H04L 65/75 | (2022.01) |

(52) U.S. Cl.
CPC .......... *H04N 19/119* (2014.11); *H04L 65/70* (2022.05); *H04L 65/75* (2022.05); *H04N 19/172* (2014.11); *H04N 19/177* (2014.11); *H04N 19/423* (2014.11)

(58) Field of Classification Search
CPC .. H04N 19/119; H04N 19/172; H04N 19/177; H04N 19/423; H04N 19/127; H04N 19/156; H04N 19/436; H04N 21/2343; H04N 19/42; H04N 21/4402; H04L 65/70; H04L 65/75
See application file for complete search history.

(56) References Cited

U.S. PATENT DOCUMENTS

| 2007/0047660 | A1* | 3/2007 | Mitani | H04N 19/174 |
| | | | | 375/E7.17 |
| 2010/0322302 | A1* | 12/2010 | Rodriguez | H04N 19/102 |
| | | | | 375/E7.026 |
| 2012/0170667 | A1* | 7/2012 | Girardeau, Jr. | H04N 19/423 |
| | | | | 375/E7.027 |
| 2016/0381365 | A1* | 12/2016 | Pearson | H04N 19/91 |
| | | | | 375/240.02 |
| 2017/0078687 | A1* | 3/2017 | Coward | H04N 19/90 |

\* cited by examiner

*Primary Examiner* — Tracy Y. Li
(74) *Attorney, Agent, or Firm* — Dority & Manning, P.A.

(57) ABSTRACT

A video encoding apparatus includes a first processor and at least two encoders. The first processor is configured to divide a sequence of video frames into M first groups of pictures (GOPs) and send the M first GOPs to the at least two encoders, M being an integer greater than 1. The at least two encoders are configured to perform parallel encoding on the received M first GOPs to obtain M groups of video encoded data and send the M groups of video encoded data to the first processor. The first processor is further configured to merge the M groups of video encoded data into a video data stream.

9 Claims, 3 Drawing Sheets

VIDEO ENCODING APPARATUS, VIDEO DECODING APPARATUS, VIDEO PLAYBACK SYSTEM AND METHOD

CROSS-REFERENCE TO RELATED APPLICATION

This application claims priority to Chinese Patent Application No. 202011008717.2, filed on Sep. 23, 2020, which is incorporated herein by reference in its entirety.

TECHNICAL FIELD

This application relates to the field of video transmission technology. More specifically, it relates to a video encoding apparatus, a video decoding apparatus, and a video playback system and method.

BACKGROUND

With the rapid development of Internet application technology and the widespread application of smart terminals, users have increasingly higher requirements for the clarity of live video broadcasts such as sports games, music performances, and anchor shows.

Ultra-high-definition video technology (such as 8K ultra-high-definition) is the development direction of future video technology. Its video pixels can reach 7680×4320, and the resolution is 16 times that of 1080P video (4 times in the length and width directions each). At this resolution, viewers can see every detail in the 8K ultra-high-definition video.

SUMMARY

In a first aspect, a video encoding apparatus is provided. The video encoding apparatus includes a first processor and at least two encoders. The first processor is configured to divide a sequence of video frames into M first groups of pictures (GOPs) and send the M first GOPs to the at least two encoders, M being an integer greater than 1. The at least two encoders are configured to perform parallel encoding on the received M first GOPs to obtain M groups of video encoded data and send the M groups of video encoded data to the first processor. The first processor is further configured to merge the M groups of video encoded data into a video data stream.

In some embodiments, the first processor is further configured to obtain the sequence of video frames from a first buffer queue. Therefore, a description that the first processor is configured to divide the sequence of video frames into M first GOPs and send the M first GOPs to the at least two encoders, includes: the first processor is configured to divide the sequence of video frames into M first GOPs according to encoding capabilities of the at least two encoders and send at least one first GOP to each encoder according to the encoding capabilities of the at least two encoders.

In some embodiments, the first processor is further configured to obtain the sequence of video frames from a first buffer queue. Therefore, a description that the first processor is configured to divide the sequence of video frames into M first GOPs and send the M first GOPs to the at least two encoders, includes: the first processor is configured to divide the sequence of video frames into M first GOPs according to encoding states of the at least two encoders and send at least one first GOP to each encoder according to the encoding states of the at least two encoders.

In some embodiments, a description that the at least two encoders are configured to perform parallel encoding on the received M first GOPs to obtain M groups of video encoded data and send the M groups of video encoded data to the first processor, includes: each of the at least two encoders is configured to encode each first GOP received to obtain at least one group of video encoded data and send the at least one group of video encoded data to the first processor.

In some embodiments, the first processor is further configured to assign a first sequence number to each of the M first GOPs. Therefore, a description that the first processor is configured to merge the M groups of video encoded data into the video data stream, includes: the first processor is configured to merge the M groups of video encoded data into the video data stream according to the first sequence number corresponding to each group of video encoded data and image frame numbers in each group of video encoded data.

In some embodiments, the first processor is further configured to store the M groups of video encoded data in a second buffer queue according to the first sequence number corresponding to each group of video encoded data and the image frame numbers in each group of video encoded data. Therefore, a description that the first processor is configured to merge the M groups of video encoded data into the video data stream, includes: the first processor is configured to merge the M groups of video encoded data into the video data stream in a case where the M groups of video encoded data are all stored in the second buffer queue.

In some embodiments, the video encoding apparatus further includes a video collector. The video collector is configured to send a collected video to the first processor. The first processor is further configured to generate the sequence of video frames according to the video.

In a second aspect, a video decoding apparatus is provided. The video decoding apparatus includes a second processor and at least two decoders. The second processor is configured to divide a video data stream into N second groups of pictures (GOPs) and send the N second GOPs to the at least two decoders, N being an integer greater than 1. The at least two decoders are configured to perform parallel decoding on the received N second GOPs to obtain N groups of video decoded data and send the N groups of video decoded data to the second processor. The second processor is further configured to merge the N groups of video decoded data into a sequence of video frames.

In some embodiments, the second processor is further configured to obtain the video data stream from a third buffer queue. Therefore, a description that the second processor is configured to divide the video data stream into N second GOPs and send the N second GOPs to the at least two decoders, includes: the second processor is configured to divide the video data stream into N second GOPs according to decoding capabilities of the at least two decoders and send at least one second GOP to each decoder according to the decoding capabilities of the at least two decoders.

In some embodiments, a description that the at least two decoders are configured to perform parallel decoding on the received N second GOPs to obtain N groups of video decoded data and send the N groups of video decoded data to the second processor, includes: each of the at least two decoders is configured to decode each second GOP received to obtain at least one group of video decoded data and send the at least one group of video decoded data to the second processor.

In some embodiments, the second processor is further configured to assign a second sequence number to each of the N second GOPs. Therefore, a description that the second processor is configured to merge the N groups of video decoded data into the sequence of video frames, includes:

the second processor configured to merge the N groups of video decoded data into the sequence of video frames according to the second sequence number corresponding to each group of video decoded data and image frame numbers in each group of video decoded data.

In some embodiments, the second processor is further configured to store the N groups of video decoded data in a fourth buffer queue according to the second sequence number corresponding to each group of video decoded data and the image frame numbers in each group of video decoded data. Therefore, the description that the second processor is configured to merge the N groups of video decoded data into the sequence of video frames, includes: the second processor is configured to merge the N groups of video decoded data into the sequence of video frames in a case where the N groups of video decoded data are all stored in the fourth buffer queue.

In some embodiments, the video decoding apparatus further includes a video player. The video player is configured to play the sequence of video frames obtained after decoding.

In a third aspect, a video playback system is provided. The video playback system includes a video encoding apparatus and a video decoding apparatus. The video encoding apparatus includes a first processor, at least two encoders, and a transmitter. The first processor is configured to divide a sequence of video frames into M first groups of pictures (GOPs) and send the M first GOPs to the at least two encoders, M being an integer greater than 1. The at least two encoders are configured to perform parallel encoding on the received M first GOPs to obtain M groups of video encoded data and send the M groups of video encoded data to the first processor. The first processor is further configured to merge the M groups of video encoded data into a video data stream. The transmitter is configured to send the video data stream to the video decoding apparatus. The video decoding apparatus includes a receiver, a second processor and at least two decoders. The receiver is configured to receive the video data stream sent by the video encoding apparatus. The second processor is configured to divide the video data stream into N second groups of pictures (GOPs) and send the N second GOPs to the at least two decoders, N being an integer greater than 1. The at least two decoders are configured to perform parallel decoding on the received N second GOPs to obtain N groups of video decoded data and send the N groups of video decoded data to the second processor. The second processor is further configured to merge the N groups of video decoded data into the sequence of video frames.

In some embodiments, the video playback system further includes a streaming media forwarding server. The streaming media forwarding server is configured to receive the video data stream sent by the video encoding apparatus and forward the video data stream to the video decoding apparatus.

In a fourth aspect, a video encoding method is provided. The video encoding method is executed by the video encoding apparatus according to the first aspect. The video encoding method includes: dividing the sequence of video frames into M first GOPs, M being an integer greater than 1; performing parallel coding on the M first GOPs to obtain M groups of video encoded data; and merging the M groups of video encoded data into the video data stream.

In a fifth aspect, a video decoding method is provided. The video decoding method is executed by the video decoding apparatus according to the second aspect. The video decoding method includes: dividing the video data stream into N second GOPs, N being an integer greater than 1; performing parallel decoding on the N second GOPs to obtain N groups of video decoded data; and merging the N groups of video decoded data into the sequence of video frames.

In a sixth aspect, a video playback method is provided. The video playback method is executed by the video playback system according to the third aspect. The video playback method includes: at the video encoding side: dividing the sequence of video frames into M first GOPs; performing parallel encoding on the M first GOPs to obtain M groups of video encoded data; and merging the M groups of video encoded data into the video data stream, M being an integer greater than 1; at the video decoding side: dividing the video data stream into N second GOPs, performing parallel decoding on the N second GOPs to obtain N groups of video decoded data; and merging the N groups of video decoded data into the sequence of video frames, N being an integer greater than 1.

In a seventh aspect, a computer device is provided. The computer device includes a memory, a processor, and a computer program stored on the memory and running on the processor. When the processor executes the computer program, the computer device executes the video playback method according to the sixth aspect.

In an eighth aspect, a non-volatile computer-readable storage medium is provided. The non-volatile computer-readable storage medium has stored thereon a computer program. When the computer program is executed by a processor, the processor executes the video playback method according to the sixth aspect.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
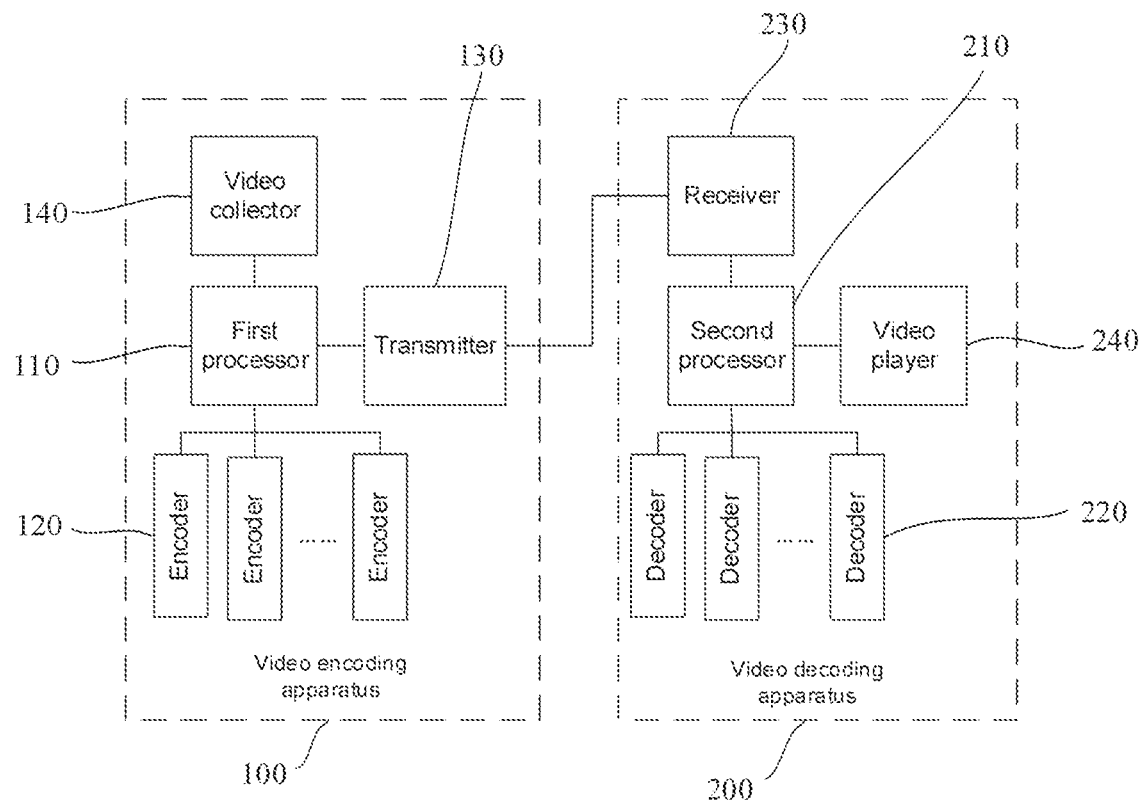
FIG. 1 is a schematic diagram showing a structure of a video playback system, in accordance with some embodiments.

Technical solutions in some embodiments of the present disclosure will be described clearly below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to."

In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled", "connected" and their derivatives may be used. For example, the term "connected" may be used in the description of some embodiments to indicate that two or more components are in direct physical contact or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "A and/or B" includes the following three combinations: only A, only B, and a combination of A and B.

As used herein, the term if is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "configured to" as used herein indicates an open and inclusive expression, which does not exclude devices that are configured to perform additional tasks or steps.

The data volume of 8K ultra-high-definition video is extremely large, and the resolution is 16 times that of 1080P video, so the encoding and decoding performance of the display apparatus is relatively high. Currently, the coding and decoding compression standards adopted for 8K ultra-high-definition video mainly include high efficiency video coding (HEVC). Although the compression efficiency of this coding and decoding compression standard is relatively high, the computational complexity is also relatively high.

Moreover, 8K video live broadcast system usually requires the codec speed to reach 60 fps (frames per second, the number of frames transmitted per second). In the related art, most of the hardware acceleration schemes are based on field-programmable gate array (FPGA) or chips, so as to achieve the 60 fps HEVC real-time encoding and decoding required by the 8K video live broadcast system. However, this hardware structure is costly and difficult to implement.

In addition, in an 8K video software encoding solution, due to the high encoding complexity and the large amount of data that needs to be processed, the 8K video encoding and decoding delays are large. As a result, the solution may not be able to meet the real-time requirements of the 8K video live broadcast system.

A video encoding apparatus, a video decoding apparatus and a video playback system provided by some embodiments of the present disclosure are illustrated below with reference to the accompanying drawings.

As shown in FIG. 1, some embodiments of the present disclosure provide a video playback system. The video playback system includes a video encoding apparatus 100 and a video decoding apparatus 200.

The video encoding apparatus 100 includes: a first processor 110 (which may also be referred to as an encoding side processor), at least two encoders 120, and a transmitter 130.

The first processor 110 is configured to divide a sequence of video frames into M first group of pictures (GOPs) (which may also be referred to as encoded GOPs) and send the M first GOPs to the at least two encoders 120. Herein, M is an integer greater than 1.

The at least two encoders 120 are configured to perform parallel encoding on the received M first GOPs to obtain M groups of video encoded data, and send the M groups of video encoded data to the first processor 110.

The first processor 110 is further configured to merge the M groups of video encoded data into a video data stream.

The transmitter 130 is configured to send the video data stream to the video decoding apparatus 200.

The video decoding apparatus 200 includes: a second processor 210 (which may also be referred to as a decoding side processor), at least two decoders 220, and a receiver 230.

The receiver 230 is configured to receive the video data stream sent by the video encoding apparatus 100.

The second processor 210 is configured to divide the video data stream into N second group of pictures (GOPs) (which may also be referred to as decoded GOPs) and send the N second GOPs to the at least two decoders 220. Herein, N is an integer greater than 1.

The at least two decoders 220 are configured to perform parallel decoding on the received N second GOPs to obtain N groups of video decoded data and send the N groups of video decoded data to the second processor 210.

The second processor 210 is further configured to merge the N groups of video decoded data into a sequence of video frames.

In some examples, the foregoing sequence of video frames may be a sequence of YUV (Luminance Bandwidth Chrominance) video frames. Of course, in actual implementation, the sequence of video frames may also be any other possible sequence of video frames, which may be determined according to actual use requirements. The embodiments of the present disclosure do not limit this.

In some embodiments, both the first processor 110 and second processor 210 may include one or more processors. For example, both the first processor 110 and the second processor 210 may include at least one of an application processor (AP), a modem processor, a graphics processing unit (GPU), an image signal processor (ISP), a digital signal processor (DSP), a baseband processor, or a neural-network processing unit (NPU). In some examples, different processors may be independent devices, or may be integrated in one or more devices.

In some embodiments, each of the at least two encoders 120 may be a compute unified device architecture (CUDA) encoder; and each of the at least two decoders 220 may be a CUDA decoder.

CUDA is a computing platform launched by the graphics card manufacturer NVIDIA. CUDA is a general-purpose parallel computing architecture launched by NVIDIA. Through this architecture, a CPU (central processing unit) can solve complex computing problems.

In some embodiments, a group of pictures (GOP) may include multiple frames of pictures in a sequence of video frames. It will be noted that, the number of frames in each GOP (for example, the first GOP and the second GOP in the present disclosure) should not be too many. For example, a GOP may include 25 frames of pictures, 30 frames of pictures, or 35 frames of pictures, etc.

In video compression, each frame represents a still picture. During actual compression of a video, various algorithms may be used to reduce data volume. Among all compression methods, the IPS compression method is the most common. Simply put, the I-frame is a key frame, which belongs to intra-frame compression (also called spatial compression), which is similar to audio video interleaved (AVI) compression. The P-frame is a one-way difference frame, and the B-frame is a two-way difference frame. Data of P-frames and B-frames can be compressed based on the I-frames.

The I-frame, P-frame, and B-frame are elaborated below by taking a frame of image as an example.

The I-frame represents a key frame, which can be understood as a picture of a frame of image that will be completely preserved. Because the complete picture of the frame of image is preserved, only the data of the frame of image is needed to complete the decoding.

The P-frame represents the one-way difference frame. That is, the P-frame records the picture difference between a frame of image and a previous key frame of image or a previous P-frame image. When decoding a P-frame, the final picture of the frame can be generated by superimposing the picture difference recorded by the P-frame on the picture of a frame buffered before the P-frame (that is, the P-frame does not have complete picture data, and only has the data corresponding to the picture difference between the P-frame and the previous frame of image).

The B-frame is a two-way difference frame. That is, the B-frame records the picture difference between a frame of image and its preceding and following frames. When decoding a B-frame, not only the buffered picture of a frame before the B-frame needs to be obtained, but also the picture of a frame after the B-frame needs to be decoded. Then, the final picture of the B-frame can be generated by superimposing the picture difference recorded by the B-frame on the pictures of the previous frame and the following frame. The B-frame has a high compression rate; however, the decoding process of the B-frame requires a lot of computing resources of the CPU.

For video coding and decoding scenarios with high real-time requirements, the I-frame and P-frame compression methods may be used; for video coding and decoding scenarios with low real-time requirements, the B-frame compression method may also be used.

The I-frame, B-frame, and P-frame are all defined according to the compression algorithm, and they are all physical frames. Which frame in the pictures is an I-frame can be random. However, after the I frame is determined, other frames need to be determined in strict order.

In some embodiments of the present disclosure, the video encoding apparatus in the video playback system may send a plurality of first GOPs obtained by dividing a sequence of video frames to a plurality of encoders for parallel encoding, and send a plurality of groups of video encoded data obtained after the encoding is completed to the first processor to be merged into a video data stream. Then, the video data stream is sent to the video decoding apparatus through the transmitter. After the video decoding apparatus receives the video data stream through the receiver, the second processor in the video decoding apparatus may divide the video data stream into a plurality of second GOPs, and send the plurality of second GOPs to a plurality of decoders for parallel decoding. Then, a plurality of groups of video decoded data obtained after the decoding is completed may be sent to the second processor to be merged into a sequence of video frames. Based on parallel coding and decoding in groups, it may be possible to greatly increase the speed of video coding and decoding, and reduce the complexity of video coding and decoding. As a result, the processing rate of video data may be increased, and the processing delay of video data may be reduced, which makes it possible to meet the requirements of live video broadcast of ultra-high-definition videos.

Due to the large amount of data of ultra-high-definition videos, the number of first GOPs obtained by dividing the sequence of video frames is also relatively large (that is, the value of M is relatively large). In this way, in some embodiments, in order to make it easier for the first processor 110 to allocate the encoders 120 to the M first GOPs obtained after dividing the sequence of video frames, the first processor 110 is further configured to assign a first sequence number to each of the M first GOPs, and merge the M groups of video encoded data into the video data stream according to the first sequence number corresponding to each group of video encoded data and image frame numbers in each group of video encoded data.

In some embodiments, the first processor 110 may evenly divide the sequence of video frames into M first GOPs. It will be understood that, in this manner, the number of image frames included in each first GOP is the same.

In some embodiments, the first processor 110 may also divide the sequence of video frames into M first GOPs according to the load capacity (which may also be referred to as encoding capacity) of the at least two encoders. It will be understood that, in this manner, the number of image frames included in each first GOP in the M first GOPs may be the same or different.

In some embodiments, the first processor 110 may evenly allocate the M first GOPs to the at least two encoders; or, the first processor 110 may, according to the encoding capabilities of the at least two encoders, allocate more first GOPs to encoders with stronger encoding capabilities and fewer first GOPs to encoders with weaker encoding capabilities, or send first GOPs with more image frames to encoders with stronger encoding capabilities. This may be determined according to actual application requirements, and is not limited in the embodiments of the present disclosure.

Figure 2:
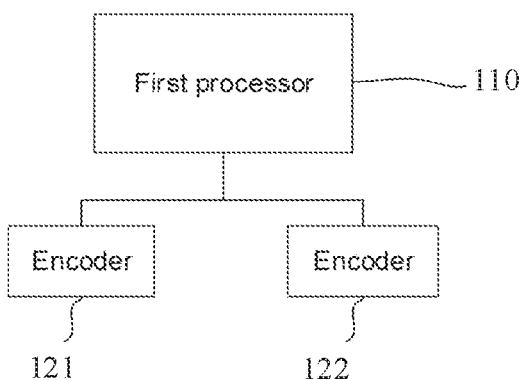
FIG. 2 is a schematic diagram showing a structure of a video encoding apparatus, in accordance with some embodiments.

In some examples, as shown in FIG. 2, it is assumed that the video encoding apparatus includes two encoders, namely, an encoder 121 and an encoder 122. Based on the principle of equal division, the first processor 110 may divide the 60 frames of pictures in the sequence of video frames in 1 second into two first GOPs, with each first GOP including 30 frames of pictures. That is, the first first GOP includes the 1st~30th frames of pictures, and the second first GOP includes the 31st~60th frames of pictures. Then, the first processor 110 may send the two first GOPs to the encoder 121 and the encoder 122 respectively. For example, the first first GOP is sent to the encoder 121 and the second first GOP is sent to the encoder 122, so that the encoder 121 and the encoder 122 may perform parallel encoding.

Figure 3:
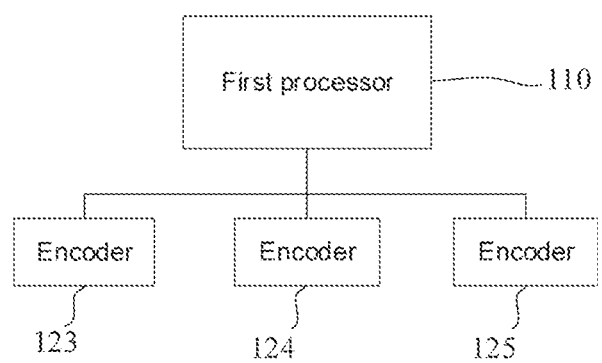
FIG. 3 is a schematic diagram showing a structure of another video encoding apparatus, in accordance with some embodiments.

In still other examples, as shown in FIG. 3, it is assumed that the video encoding apparatus 100 includes three encoders, namely, an encoder 123, an encoder 124, and an encoder 125. Based on the principle of equal division, the first processor 110 may divide the 60 frames of pictures in the sequence of video frames in 1 second into three first GOPs, with each first GOP including 20 frames of pictures. Then, the first processor may send the three first GOPs to the encoder 123, the encoder 124, and the encoder 125 respectively. For example, the first first GOP is sent to the encoder 123, the second first GOP is sent to the encoder 124, and the third first GOP is sent to the encoder 125, so that the encoder 123, the encoder 124, and the encoder 125 may perform parallel encoding.

In order to speed up the encoding rate of the sequence of video frames, in some embodiments, the first processor may also be configured to obtain the sequence of video frames from a first buffer queue. The description that the first processor is configured to divide the sequence of video frames into M first GOPs and send the M first GOPs to the at least two encoders may include: the first processor is configured to divide the sequence of video frames into M first GOPs according to encoding capabilities of the at least two encoders and send at least one GOP to each encoder according to the encoding capabilities of the at least two encoders.

It will be noted that the encoding capabilities represent the encoding speed of the encoder. For example, if the encoding speed of an encoder is fast, then the encoding capabilities of the encoder is strong; if the encoding speed of an encoder is slow, the encoding capabilities of the encoder is weak.

In some embodiments, the first processor may also be configured to obtain the sequence of video frames from a first buffer queue. The description that the first processor is configured to divide the sequence of video frames into M first GOPs and send the M first GOPs to the at least two encoders may include: the first processor is configured to divide the sequence of video frames into M first GOPs according to encoding states of the at least two encoders (which may also be referred to as load states) and send at least one first GOP to each encoder according to the encoding states of the at least two encoders.

It will be noted that, the encoding state can be used to indicate whether the encoder is currently in a working state. If the encoder is currently performing an encoding operation, it means that the encoder is in a working state; if the encoder is not currently performing an encoding operation, it means that the encoder is not in a working state. Alternatively, the encoding state may also be used to indicate the number of image frames to be encoded in a to-be-encoded queue of the encoder. If the encoding state of the encoder is a light load state, it means that the number of image frames to be encoded in the to-be-encoded queue of the encoder is small; if the encoding state of the encoder is a heavy load state, it means that the number of image frames to be encoded in the to-be-encoded queue of the encoder is large.

In some embodiments, the first buffer queue may be a buffer queue in the first processor.

In some examples, as shown in FIG. 2, the video encoding apparatus 100 includes two encoders, namely, an encoder 121 and an encoder 122. The video encoding apparatus 100 may buffer the YUV data of 60 frames of original pictures transmitted within one second of the 8K video in the buffer queue of the first processor 110 (that is, the first buffer queue), and start a thread (a length of the first GOP is set to 30). In this way, the first processor 110 may obtain the sequence of video frames of the original pictures of the 8K video from the first buffer queue, divide the sequence of video frames into two first GOPs, label each first GOP according to the first sequence number, and then send the two first GOPs to the encoder 121 and the encoder 122 respectively. For example, the first (in this case, the first sequence number is 1) first GOP (the 1st~30th frames of pictures) is sent to the encoder 121, and the second (in this case, the first sequence number is 2) first GOP (the 31st~60th frames of pictures) are sent to the encoder 122. Then, the 60 frames of original pictures of the next second of the 8K video are also divided into two first GOPs in this way, and the third (in this case, the first sequence number is 3) first GOP (the 61s~90th frames of pictures) is sent to the encoder 121, and the fourth (in this case, the first sequence number is 4) first GOP (the 91st~120th frames of pictures) is sent to the encoder 122, and so forth.

Taking the encoder 121 as an example, the encoder 121 may be configured in a way that it processes a single first GOP in a single encoding process. That is, after the encoder 121 receives the first first GOP sent by the first processor 110, the encoder 121 starts encoding (for example, HEVC encoding). The working state of the encoder 121 at this time may be set to 1, which indicates that the encoder 121 is encoding. In this state, the encoder 121 will no longer receive the first GOP sent by the first processor 110. After the encoder 121 completes the encoding of the first first GOP, the encoder 121 may send the video encoded data obtained by encoding the first first GOP to the first processor 110, thereby completing an encoding process. The working state of the encoder 121 at this time may be set to 0, which indicates that the encoder 121 is not encoding, and can receive the first GOP (for example, the third first GOP) sent by the first processor 110. Therefore, when the encoder 121 receives the first GOP, the encoder 121 may continue encoding.

It will be noted that, at a same time when the encoder 121 is encoding the first first GOP, the encoder 122 is also encoding the second first GOP. In this way, through parallel encoding of the two encoders, the encoding efficiency may be improved.

In some embodiments, the first processor 110 may divide the sequence of video frames according to the encoding capabilities (or encoding states) of each of the at least two encoders, and allocate corresponding first GOPs to each encoder.

For example, in a case where the video encoding apparatus shown in FIG. 3 includes three encoders, namely an encoder 123, an encoder 124, and an encoder 125, the first processor 110 may divide the 60 frames of pictures in a one second sequence of video frames into three first GOPs according to respective encoding capabilities of the encoder 123, the encoder 124 and the encoder 125. The first first GOP includes 15 frames of pictures, the second first GOP includes 30 frames of pictures, and the third first GOP includes 15 frames of pictures. In a case where the encoder 123 and the encoder 125 have weak encoding capabilities, and the encoder 124 has strong encoding capabilities, the first first GOP is sent to the encoder 123, the second first GOP is sent to the encoder 124, and the third first GOP is sent to the encoder 125, so that the encoder 123, the encoder 124, and the encoder 125 perform parallel encoding.

For another example, the first processor 110 may divide the 60 frames of pictures in the one second sequence of video frames into four GOPs according to respective load states of the encoder 123, the encoder 124, and the encoder 125. The first first GOP includes 30 frames of pictures, the second first GOP includes 15 frames of pictures, the third first GOP includes 5 frames of pictures, and the fourth first GOP includes 10 frames of pictures. In a case where the encoder 123 is lightly loaded, the encoder 124 is heavily loaded, and the encoder 125 is extremely heavily loaded, the first processor may send the first first GOP to the encoder 123, send the second first GOP and the fourth first GOP to the encoder 124, and send the third first GOP to the encoder 125, so that the encoder 123, the encoder 124, and the encoder 125 perform parallel encoding.

In some embodiments, the description that the at least two encoders are configured to perform parallel encoding on the received M first GOPs to obtain M groups of video encoded data and send the M groups of video encoded data to the first processor, includes: each of the at least two encoders is configured to encode each first GOP received to obtain at least one group of video encoded data and send the at least one group of video encoded data to the first processor.

It will be understood that, in some embodiments of the present disclosure, after receiving the at least one first GOP, each of the at least two encoders may encode the at least one first GOP it receives to obtain at least one group of video encoded data, and send the at least one group of video encoded data to the first processor, so that the first processor receives M groups of video encoded data.

In some embodiments of the present disclosure, some of the at least two encoders may receive a relatively large number of first GOPs, and other encoders may receive a relatively small number of first GOPs. For example, the number of first GOPs received by an encoder may be determined according to the encoding speed of the encoder. Of course, in actual implementation, the number of first GOPs received by an encoder may also be determined according to other possible factors, which is not limited in the embodiment of the present disclosure.

The video data stream is obtained by the first processor 110 by merging a plurality of groups of video encoded data after the at least two encoders 120 all completed their encoding tasks. Therefore, in order to avoid a problem of data loss caused by incomplete video encoded data received by the first processor 110, in some embodiments, the first processor 110 may further be configured to store the M groups of video encoded data in a second buffer queue according to the first sequence number corresponding to each group of video encoded data and the image frame numbers in each group of video encoded data, and merge the M groups of video encoded data into a video data stream in a case where the M groups of video encoded data are all stored in the second buffer queue.

It will be noted that, the second buffer queue may be stored in the first processor 110.

In some examples, each first GOP has a corresponding first sequence number, and each image frame in each first GOP also has a frame number. Therefore, after the at least two encoders 120 send the M groups of video encoded data obtained by encoding to the first processor, the first processor 110 may store each group of video encoded data to a corresponding position of the group of video encoded data in the second buffer queue according to the first sequence number corresponding to each group of video encoded data and the image frame numbers in each group of video encoded data. In addition, the first processor may also perform another thread. That is, the first processor 110 may detect in real time whether all the M groups of video encoded data have been stored in the second buffer queue. In a case where all the M groups of video encoded data have been stored in the second buffer queue, the first processor 110 may determine that the M GOPs obtained by dividing the sequence of video frames have all been encoded, so that the first processor 110 may merge the M groups of video encoded data in the second buffer queue into a video data stream (for example, an elementary stream).

In some embodiments, the video encoding apparatus 100 may further include: a video collector 140 configured to send a collected video to the first processor 110. The first processor 110 may further be configured to generate the sequence of video frames according to the video. Thus, the video encoding apparatus 100 is applicable to a scenario of live video broadcast.

After the video data stream is generated, the transmitter 130 of the video encoding apparatus 100 may send the video data stream to the receiver 230 of the video decoding apparatus 200, so that the video decoding apparatus 200 decodes the video data stream.

Figure 5:
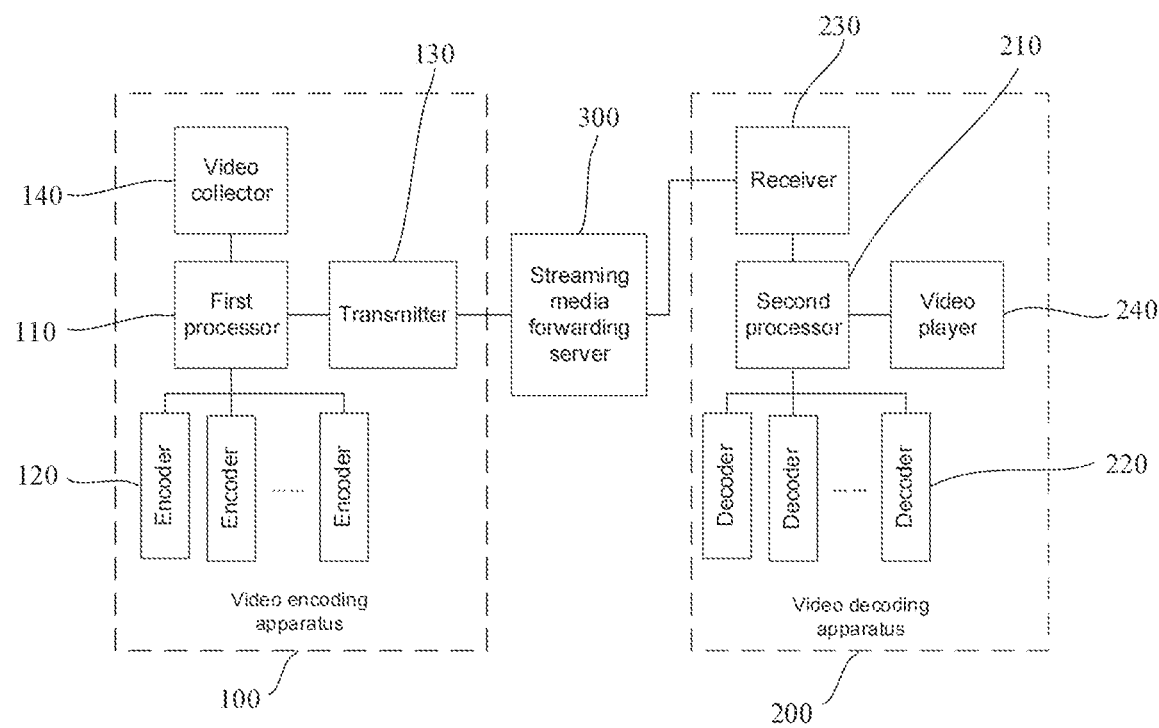
FIG. 5 is a schematic diagram showing a structure of another video playback system, in accordance with some embodiments.

In the scenario of live video broadcast, thousands of users may watch the live broadcast of a same anchor show at the same time. Therefore, in order to enable the devices of these users to receive the live video of the anchor show, as shown in FIG. 5, in some embodiments, the video playback system further includes: a streaming media forwarding server 300 configured to receive the video data stream sent by the video encoding apparatus 100 and forward the video data stream to the video decoding apparatus 200.

It will be noted that, the streaming media forwarding server 300 provided by some embodiments of the present disclosure may be connected to the transmitter 130 of the video encoding apparatus 100 and the receiver 230 of the video decoding apparatus 200 via a network.

In some embodiments, the transmitter 130 and the receiver 230 may include, but are not limited to, an antenna, at least one amplifier, a transceiver, a coupler, a low noise amplifier, a duplexer, etc.

In an example, the transmitter 130 packages the video data stream according to the Real-time Transport Protocol (RTP), and sends the packaged video data stream to the streaming media forwarding server 300, so that the streaming media forwarding server 300 forwards it to the receiver 230. The second processor 210 may buffer the received RTP data packet of the video data stream in the third buffer queue of the second processor 210, and detect whether the received RTP data packet is a complete RTP data packet of the video data stream. If it is determined that a complete RTP data packet of the video data stream has been received, the video decoding apparatus 200 may perform the video decoding process; otherwise, the video decoding apparatus 200 will wait for the arrival of the next RTP data packet of the video data stream, until all the RTP data packets of the video data stream are received.

The RTP protocol is often used in streaming media systems (in combination with RTCP (Real-time Transport Control Protocol) or RTSP (Real Time Streaming Protocol)), An RTP data packet may be composed of two parts: header and payload. The meaning of the first 12 bytes of the header is fixed, and the payload may be audio data or video data.

Similar to the video encoding apparatus 100, in order to speed up the decoding rate of the video data stream, in some embodiments, the second processor 210 is further configured to obtain the video data stream from a third buffer queue. The description that the second processor is configured to divide the video data stream into N second GOPs and send the N second GOPs to at least two decoders, includes: the second processor is configured to divide the video data stream into N second GOPs according to decoding capabilities of the at least two decoders and send at least one second GOP to each decoder according to the decoding capabilities of the at least two decoders.

The description that the at least two decoders 220 are configured to perform parallel decoding on the received N second GOPs to obtain N groups of video decoded data and send the N groups of video decoded data to the second processor, includes: each of the at least two decoders is configured to decode each second GOP received to obtain at least one group of video decoded data, and send the at least one group of video decoded data to the second processor.

It will be noted that, the method of dividing the video data stream is similar to the method of dividing the sequence of video frames, and for details, reference may be made to the above description. Accordingly, the manner in which the second processor 210 allocates the N second GOPs to the at least two decoders 220 is similar to the manner in which the first processor 110 allocates the M first GOPs to the at least two encoders 120, and for details, reference may be made to the above description. The work flow of the at least two decoders 220 is similar to the work flow of the at least two encoders 120, and for details, reference may be made to the above description.

It will be noted that, the number of encoders 120 in the video encoding apparatus 100 and the number of decoders 220 in the video decoding apparatus 200 may be the same or different. For example, in a case where the video encoding apparatus 100 includes two encoders, the video decoding apparatus 200 may include two decoders, or may include three decoders, or may include four decoders, which may be determined according to actual usage requirements.

Figure 4:
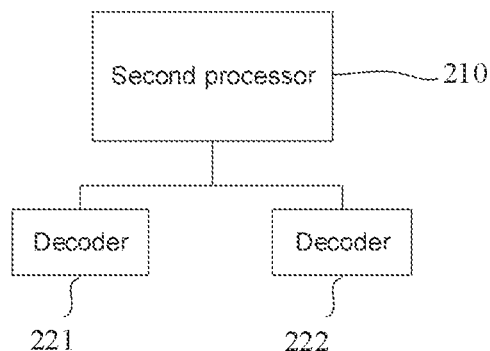
FIG. 4 is a schematic diagram showing a structure of a video decoding apparatus, in accordance with some embodiments.

In some examples, as shown in FIG. 4, the video decoding apparatus 200 includes two decoders, namely a decoder 221 and a decoder 222, and the video decoding apparatus 200 buffers the received video data stream in a third buffer queue (for example, in a third buffer queue of the second processor 210); and the length of the GOP of the video decoded data (that is, the second group of pictures) is set to 30. The second processor 210 may, after labeling each second GOP, send two GOPs within one second to the decoder 221 and the decoder 222 respectively. For example, the first second GOP (1st~30th frames of pictures) is sent to the decoder 221, and the second second GOP (the 31st~60th frames of pictures) is sent to the decoder 222; the third second GOP (the 61st~90th frames of pictures) of the next second is sent to the decoder 221, and the fourth second GOP (the 91st~120th frames of pictures) is sent to the decoder 222, and so forth.

Taking the decoder 221 as an example, the decoder 221 may be configured in a way that it processes a single second GOP in a single decoding process. That is, after the decoder 221 receives the first second GOP sent by the second processor 210, the decoder 221 starts decoding (for example, HEVC decoding). The working state of the decoder 221 at this time may be set to 1, which indicates that the decoder 221 is decoding. In this state, the decoder 221 will no longer receive the second GOP sent by the second processor 210. After the decoder 221 completes the decoding of the first second GOP, the decoder 221 may send the video decoded data obtained by decoding the first second GOP to the second processor 210, thereby completing a decoding process. The working state of the decoder 221 at this time may be set to 0, which indicates that the decoder 221 is not decoding, and can receive the second GOP (for example, the third second GOP) sent by the second processor 210. Therefore, when the decoder 221 receives the second GOP, the decoder 221 may continue decoding.

It will be noted that, at a same time when the decoder 221 is decoding the first second GOP, the decoder 222 is also decoding the second second GOP. In this way, through parallel decoding of the two decoders, the decoding efficiency may be improved.

Due to the large amount of data of ultra-high-definition videos, the number of second GOPs obtained by dividing the video data stream is also relatively large (that is, the value of N is relatively large). In this way, in some embodiments, in order to make it easier for the second processor 210 to allocate the decoders 220 to the N second GOPs obtained after dividing the video data stream, the second processor 210 is further configured to assign a second sequence number to each of the N second GOPs, and merge the N groups of video decoded data into the sequence of video frames according to the second sequence number corresponding to each group of video decoded data and image frame numbers in each group of video decoded data. In this way, through the second sequence number of the second GOP, it is convenient to arrange the order of the data after parallel decoding. Therefore, it may be possible to avoid the problem of mismatched video decoded data in the process of merging the N groups of video decoded data into the sequence of video frames, and thereby improve the accuracy of video decoding.

It will be noted that, if the number of the second GOPs is the same as the number of the first GOPs (i.e., N=M), and the number of image frames included in each pair of first GOP and second GOP with the same sequence number is the same (for example, the second second GOP and the second first GOP both include 30 frames of pictures), then the first sequence numbers of the first GOPs exactly correspond to the second sequence numbers of the second GOPs.

The second processor is further configured to store the N groups of video decoded data in a fourth buffer queue according to the second sequence number corresponding to each group of video decoded data and the image frame numbers in each group of video decoded data.

The description that the second processor is configured to merge the N groups of video decoded data into the sequence of video frames, includes:

the second processor is configured to merge the N groups of video decoded data into the sequence of video frames in a case where the N groups of video decoded data are all stored in the fourth buffer queue.

In some embodiments, the sequence of video frames is obtained by the second processor 210 by merging a plurality of groups of video decoded data after the at least two decoders 220 all completed their decoding tasks. Therefore, in order to avoid a problem of data loss caused by incomplete video decoded data received by the second processor 210, in some embodiments, the second processor 210 may further be configured to store the N groups of video decoded data in a fourth buffer queue according to the second sequence number corresponding to each group of video decoded data and the image frame numbers in each group of video decoded data, and merge the N groups of video decoded data into a sequence of video frames in a case where the N groups of video decoded data are all stored in the fourth buffer queue.

It will be noted that, the fourth buffer queue may be stored in the second processor 210.

In some examples, each second GOP has a corresponding second sequence number, and each image frame in each second GOP also has a frame number. Therefore, after the at least two decoders send the N groups of video decoded data obtained by decoding to the second processor, the second processor may store the N groups of video decoded data in corresponding positions in the fourth buffer queue according to the second sequence number corresponding to each group of video decoded data and the image frame numbers in each group of video decoded data. And when the second processor 210 detects that all the N groups of video decoded data have been stored in the fourth buffer queue, the second processor may determine that the N second GOPs obtained by dividing the video data stream have all been decoded, so that the second processor may merge the N groups of video decoded data in the fourth buffer queue into a sequence of video frames (for example, a YUV sequence of video frames).

In some embodiments, the video decoding apparatus 200 further includes: a video player 240 configured to play the sequence of video frames obtained after decoding. In some examples, the second processor 210 renders and displays the merged YUV sequence of video frames through the video player 240 according to the timestamp.

Figure 6:
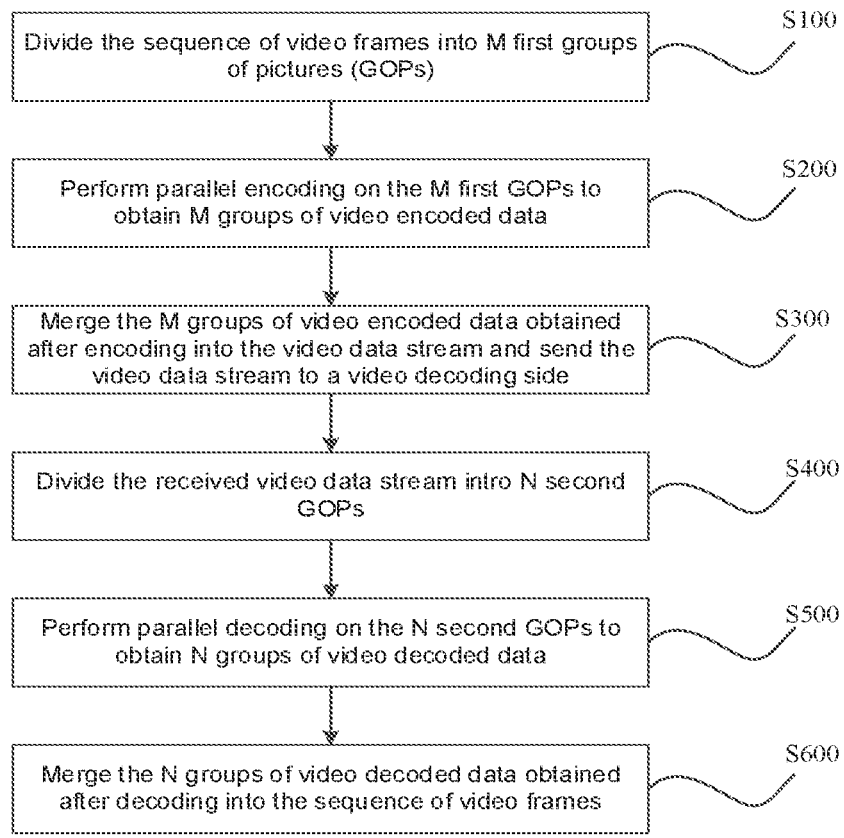
FIG. 6 is a flow chart of a video playback method, in accordance with some embodiments.

As shown in FIG. 6, some embodiments of the present disclosure further provide a video playback method, which includes steps 100 to 600 (S100~600).

S100~300 are performed at the video encoding side (that is, the video encoding method performed by the video encoding apparatus).

In S100, the sequence of video frames is divided into M first GOPs, M being an integer greater than 1.

In S200, parallel encoding is performed on the M first GOPs to obtain M groups of video encoded data.

In S300, the M groups of video encoded data obtained after encoding are merged into a video data stream, and the video data stream is sent to a video decoding side.

S400~600 are performed at the video decoding side (that is, the video decoding method performed by the video decoding apparatus).

In S400, the received video data stream is divided into N second GOPs, N being an integer greater than 1.

In S500, parallel decoding is performed on the N second GOPs to obtain N groups of video decoded data.

In S600, the N groups of video decoded data obtained after decoding are merged into the sequence of video frames.

It will be noted that, the principle and work flow of the video playback method provided in some embodiments of the present disclosure are similar to the principle and work flow of the video playback system described above. For related information, reference may be made to the above description, and details will not be repeated here.

Figure 7:
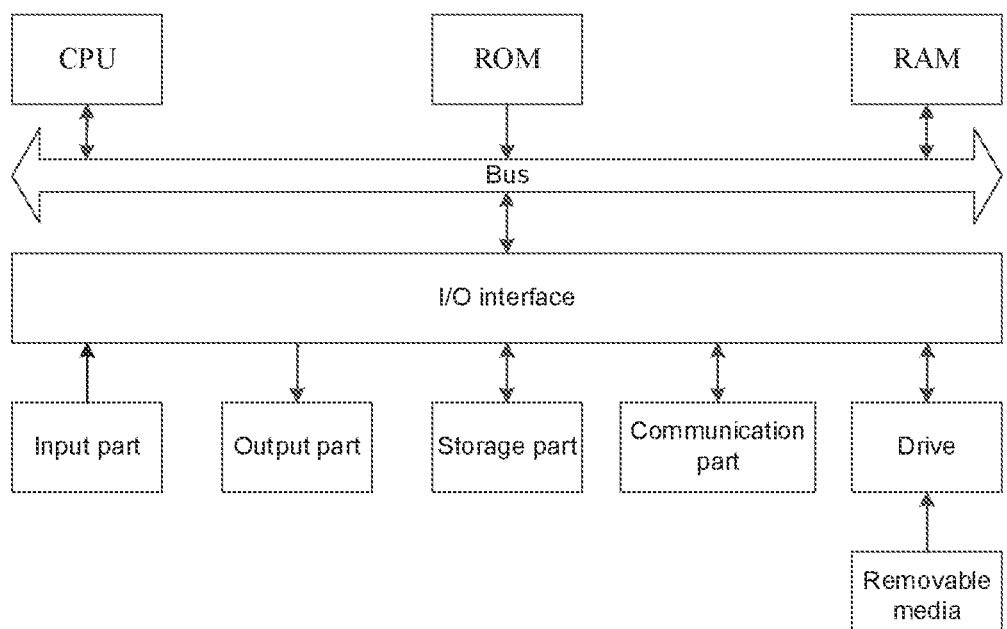
FIG. 7 is a schematic diagram showing a structure of a computer system, in accordance with some embodiments.

As shown in FIG. 7, some embodiments of the present disclosure further provide a computer system suitable for implementing the video encoding apparatus or video decoding apparatus in the video playback system provided by the above description. The computer system includes a central processing module (CPU), which can perform various appropriate actions and processes according to programs stored in a read-only memory (ROM) or programs loaded into a random access memory (RAM) from a storage section. The RAM has also stored thereon various programs and data required for the operation of the computer system. The CPU, ROM and RAM are connected to each other by a bus. The input/output (I/O) interface is also connected to the bus.

Components connected to the I/O interface may include at least one of an input part, an output part, a storage part, or a communication part. The input part may include devices such as a keyboard and a mouse; the output part may include devices such as a liquid crystal display (LCD) and a speaker; the storage part may include devices such as a hard disk; and the communication part may include network interface cards such as an LAN card and a modem. The communication part performs communication processing via a network such as the Internet. The drive may also be connected to the I/O interface as needed. Removable media, such as magnetic disks, optical disks, magneto-optical disks, semiconductor memories, etc., are installed on the drive as needed, so that computer programs read from them can be installed into the storage part as needed.

It will be noted that, according to some embodiments, the process described in the flowchart above can be implemented as a computer software program. For example, this embodiment includes a computer program product, which includes a computer program tangibly contained on a non-volatile computer-readable storage medium. The computer program includes a program for executing the video decoding method or video decoding method described in the above embodiments. In such embodiments, the computer program may be downloaded and installed from the network through the communication part, and/or installed from a removable medium.

The flowcharts and schematic diagrams in the drawings illustrate the possible implementation architecture, functions, and operations of the systems, methods, and computer program products of some embodiments. In this regard, each block in the flowchart or schematic diagram may represent a module, a program segment, or part of the code, and the module, program segment, or part of the code contains one or more executable instructions for realizing the specified logic function. It will also be noted that, in some alternative implementations, the functions marked in the block may also occur in an order different from the order marked in the drawings. For example, two blocks shown in succession may actually be executed substantially in parallel, and they can sometimes be executed in the reverse order, depending on the functions involved. It will also be noted that, each block in the schematic diagram and/or flowchart and the combination of the blocks in the schematic diagram and/or flowchart may be implemented by a dedicated hardware-based system that performs the specified functions or operations, or may be implemented by a combination of dedicated hardware and computer instructions.

As another aspect, some embodiments further provide a non-volatile computer-readable storage medium. The non-volatile computer-readable storage medium may be the non-volatile computer-readable storage medium included in the apparatuses provided in the above embodiments. It may also be a non-volatile computer readable storage medium that exists alone and is not assembled into the terminal. The non-volatile computer-readable storage medium has stored thereon one or more programs, and when the one or more programs are executed by a device, the device implements the video encoding process and/or the video decoding process of the foregoing embodiments.

The technology provided by some embodiments of the present disclosure may be applied in the field of digital signal processing, and implemented by a video encoder or a video decoder. Video encoders and video decoders are widely used in various kinds of communication devices or electronic devices, such as: digital TVs, set-top boxes, media gateways, mobile phones, wireless devices, personal data assistants (PDAs), handheld or portable computers, GPS receivers/navigators, cameras, video players, video cameras, video recorders, surveillance equipment, video conferencing and video phone equipment, etc. Such devices include processors, memories, and interfaces for data transmission. The video encoders and video decoders may be directly implemented by a digital circuit or chip, such as a DSP (Digital Signal Processor), or implemented by using a software code to drive a processor to execute a process in the software code.

For example, the video encoding apparatus and video decoding apparatus of the present disclosure may be terminal devices, such as mobile phones, tablet computers, personal computers (PCs), personal digital assistants (PDAs), smart watches, netbooks, wearable electronic devices, augmented reality (AR) devices, virtual reality (VR) devices, robots, etc. The present disclosure does not impose special restrictions on the specific form of the terminal devices.

However, the above embodiments of the present disclosure are merely examples to clearly illustrate the present disclosure, and are not meant to limit the implementations of the present disclosure. A person of ordinary skill in the art may make different forms of changes or replacements on a basis of the above description, and it is not possible to list all the implementations here. Any obvious changes or replacements derived from the technical solutions of the present disclosure are still within the range of protection of the present disclosure.

What is claimed is:

1. A video encoding apparatus, comprising:
a first processor, configured to divide a sequence of video frames into M first groups of pictures (GOPs) and send the M first GOPs to at least two encoders, M being an integer greater than 1; and
the at least two encoders, configured to perform parallel encoding on the received M first GOPs to obtain M groups of video encoded data and send the M groups of video encoded data to the first processor, wherein a number of image frames within each of the M first GOPs are equal, and image frames of two adjacent first GOPs in the M first GOPs are not overlapped; wherein
the first processor is further configured to merge the M groups of video encoded data into a video data stream;
wherein the first processor is further configured to obtain the sequence of video frames from a first buffer queue; and
a description that the first processor is configured to divide the sequence of video frames into M first GOPs and send the M first GOPs to the at least two encoders, includes:
the first processor is configured to divide the sequence of video frames into M first GOPs according to encoding capabilities of the at least two encoders and send at least one first GOP to each encoder according to the encoding capabilities of the at least two encoders;
wherein the first processor is further configured to obtain the sequence of video frames from a first buffer queue; and
a description that the first processor is configured to divide the sequence of video frames into M first GOPs and send the M first GOPs to the at least two encoders, includes:
the first processor is configured to divide the sequence of video frames into M first GOPs according to encoding states of the at least two encoders and send at least one first GOP to each encoder according to the encoding states of the at least two encoders;
wherein a description that the at least two encoders are configured to perform parallel encoding on the received M first GOPs to obtain M groups of video encoded data and send the M groups of video encoded data to the first processor, includes:
each of the at least two encoders is configured to encode each first GOP received to obtain at least one group of video encoded data and send the at least one group of video encoded data to the first processor;
wherein the first processor is further configured to assign a first sequence number to each of the M first GOPs; and
a description that the first processor is configured to merge the M groups of video encoded data into the video data stream, includes:
the first processor is configured to merge the M groups of video encoded data into the video data stream according to the first sequence number corresponding to each group of video encoded data and image frame numbers in each group of video encoded data;
wherein the first processor is further configured to store the M groups of video encoded data in a second buffer queue according to the first sequence number corresponding to each group of video encoded data and the image frame numbers in each group of video encoded data; and
the description that the first processor is configured to merge the M groups of video encoded data into the video data stream, includes:
the first processor is configured to merge the M groups of video encoded data into the video data stream in a case where the M groups of video encoded data are all stored in the second buffer queue; and
the video encoding apparatus further comprises:
a video collector, configured to send a collected video to the first processor, wherein
the first processor is further configured to generate the sequence of video frames according to the video.

2. A video encoding method, which is executed by the video encoding apparatus according to claim 1, comprising:
dividing the sequence of video frames into M first GOPs, M being an integer greater than 1;
performing parallel coding on the M first GOPs to obtain M groups of video encoded data; and
merging the M groups of video encoded data into the video data stream.

3. A video decoding apparatus, comprising:
a second processor, configured to divide a video data stream into N second groups of pictures (GOPs) and send the N second GOPs to at least two decoders, N being an integer greater than 1; and the at least two decoders, configured to perform parallel decoding on the received N second GOPs to obtain N groups of video decoded data and send the N groups of video decoded data to the second processor, wherein a number of image frames within each of the N second GOPs are equal, and image frames of two adjacent second GOPs in the N second GOPs are not overlapped; wherein the second processor is further configured to merge the N groups of video decoded data into a sequence of video frames;

wherein the second processor is further configured to obtain the video data stream from a third buffer queue, and a description that the second processor is configured to divide the video data stream into N second GOPs and send the N second GOPs to the at least two decoders, includes:

the second processor is configured to divide the video data stream into N second GOPs according to decoding capabilities of the at least two decoders and send at least one second GOP to each decoder according to the decoding capabilities of the at least two decoders;

wherein a description that the at least two decoders are configured to perform parallel decoding on the received N second GOPs to obtain N groups of video decoded data and send the N groups of video decoded data to the second processor, includes:

each of the at least two decoders is configured to decode each second GOP received to obtain at least one group of video decoded data and send the at least one group of video decoded data to the second processor;

wherein the second processor is further configured to assign a second sequence number to each of the N second GOPs; and a description that the second processor is configured to merge the N groups of video decoded data into the sequence of video frames, includes:

the second processor configured to merge the N groups of video decoded data into the sequence of video frames according to the second sequence number corresponding to each group of video decoded data and image frame numbers in each group of video decoded data;

wherein the second processor is further configured to store the N groups of video decoded data in a fourth buffer queue according to the second sequence number corresponding to each group of video decoded data and the image frame numbers in each group of video decoded data; and the description that the second processor is configured to merge the N groups of video decoded data into the sequence of video frames, includes:

the second processor is configured to merge the N groups of video decoded data into the sequence of video frames in a case where the N groups of video decoded data are all stored in the fourth buffer queue; and the video decoding apparatus further comprises:

a video player, configured to play the sequence of video frames obtained after decoding.

4. A video decoding method, which is executed by the video decoding apparatus according to claim 3, comprising:

dividing the video data stream into N second GOPs, N being an integer greater than 1;

performing parallel decoding on the N second GOPs to obtain N groups of video decoded data; and merging the N groups of video decoded data into the sequence of video frames.

5. A video playback system comprising a video encoding apparatus and a video decoding apparatus, wherein the video encoding apparatus includes:

a first processor, configured to divide a sequence of video frames into M first groups of pictures (GOPs) and send the M first GOPs to at least two encoders, M being an integer greater than 1;

the at least two encoders, configured to perform parallel encoding on the received M first GOPs to obtain M groups of video encoded data and send the M groups of video encoded data to the first processor, wherein a number of image frames within each of the M first GOPs are equal, and image frames of two adjacent first GOPs in the M first GOPs are not overlapped; wherein the first processor is further configured to merge the M groups of video encoded data into a video data stream;

wherein the first processor is further configured to obtain the sequence of video frames from a first buffer queue; and a description that the first processor is configured to divide the sequence of video frames into M first GOPs and send the M first GOPs to the at least two encoders, includes:

the first processor is configured to divide the sequence of video frames into M first GOPs according to encoding capabilities of the at least two encoders and send at least one first GOP to each encoder according to the encoding capabilities of the at least two encoders;

wherein the first processor is further configured to obtain the sequence of video frames from a first buffer queue; and a description that the first processor is configured to divide the sequence of video frames into M first GOPs and send the M first GOPs to the at least two encoders, includes:

the first processor is configured to divide the sequence of video frames into M first GOPs according to encoding states of the at least two encoders and send at least one first GOP to each encoder according to the encoding states of the at least two encoders;

wherein a description that the at least two encoders are configured to perform parallel encoding on the received M first GOPs to obtain M groups of video encoded data and send the M groups of video encoded data to the first processor, includes:

each of the at least two encoders is configured to encode each first GOP received to obtain at least one group of video encoded data and send the at least one group of video encoded data to the first processor;

wherein the first processor is further configured to assign a first sequence number to each of the M first GOPs; and a description that the first processor is configured to merge the M groups of video encoded data into the video data stream, includes:

the first processor is configured to merge the M groups of video encoded data into the video data stream according to the first sequence number corresponding to each group of video encoded data and image frame numbers in each group of video encoded data;

wherein the first processor is further configured to store the M groups of video encoded data in a second buffer queue according to the first sequence number corresponding to each group of video encoded data and the image frame numbers in each group of video encoded data; and the description that the first processor is configured to merge the M groups of video encoded data into the video data stream, includes:

the first processor is configured to merge the M groups of video encoded data into the video data stream in a case where the M groups of video encoded data are all stored in the second buffer queue; and the video encoding apparatus further comprises:

a video collector, configured to send a collected video to the first processor, wherein the first processor is further configured to generate the sequence of video frames according to the video; and a transmitter, configured to send the video data stream to the video decoding apparatus;

the video decoding apparatus includes:

a receiver, configured to receive the video data stream sent by the video encoding apparatus;

a second processor, configured to divide the video data stream into N second groups of pictures (GOPs) and send the N second GOPs to at least two decoders, N being an integer greater than one; and the at least two decoders, configured to perform parallel decoding on the received N second GOPs to obtain N groups of video decoded data and send the N groups of video decoded data to the second processor, wherein a number of image frames within each of the N second GOPs are equal, and image frames of two adjacent second GOPs in the N second GOPs are not overlapped; wherein the second processor is further configured to merge the N groups of video decoded data into the sequence of video frames;

wherein the second processor is further configured to obtain the video data stream from a third buffer queue, and a description that the second processor is configured to divide the video data stream into N second GOPs and send the N second GOPs to the at least two decoders, includes:

the second processor is configured to divide the video data stream into N second GOPs according to decoding capabilities of the at least two decoders and send at least one second GOP to each decoder according to the decoding capabilities of the at least two decoders;

wherein a description that the at least two decoders are configured to perform parallel decoding on the received N second GOPs to obtain N groups of video decoded data and send the N groups of video decoded data to the second processor, includes:

each of the at least two decoders is configured to decode each second GOP received to obtain at least one group of video decoded data and send the at least one group of video decoded data to the second processor;

wherein the second processor is further configured to assign a second sequence number to each of the N second GOPs; and a description that the second processor is configured to merge the N groups of video decoded data into the sequence of video frames, includes:

the second processor configured to merge the N groups of video decoded data into the sequence of video frames according to the second sequence number corresponding to each group of video decoded data and image frame numbers in each group of video decoded data;

wherein the second processor is further configured to store the N groups of video decoded data in a fourth buffer queue according to the second sequence number corresponding to each group of video decoded data and the image frame numbers in each group of video decoded data; and the description that the second processor is configured to merge the N groups of video decoded data into the sequence of video frames, includes:

the second processor is configured to merge the N groups of video decoded data into the sequence of video frames in a case where the N groups of video decoded data are all stored in the fourth buffer queue; and the video decoding apparatus further comprises:

a video player, configured to play the sequence of video frames obtained after decoding.

6. The video playback system according to claim 5, further comprising:

a streaming media forwarding server, configured to receive the video data stream sent by the video encoding apparatus and forward the video data stream to the video decoding apparatus.

7. A video playback method, which is executed by the video playback system according to claim 5, comprising:

at the video encoding side: dividing the sequence of video frames into M first GOPs; performing parallel encoding on the M first GOPs to obtain M groups of video encoded data; and merging the M groups of video encoded data into the video data stream, M being an integer greater than 1;

at the video decoding side: dividing the video data stream into N second GOPs; performing parallel decoding on the N second GOPs to obtain N groups of video decoded data; and merging the N groups of video decoded data into the sequence of video frames, N being an integer greater than 1.

8. A computer device, comprising a memory, a processor, and a computer program stored on the memory and running on the processor, wherein when the processor executes the computer program, the computer device executes the method according to claim 7.

9. A non-volatile computer-readable storage medium having stored thereon a computer program, wherein when the computer program is executed by a processor, the processor executes the method according to claim 7.

* * * * *